United States Patent [19]

Sting et al.

[11] 4,082,327
[45] Apr. 4, 1978

[54] CONNECTING JOINT FOR CORRUGATED PLASTIC TUBING

[75] Inventors: Donald W. Sting; Denis P. Ott, both of Findlay, Ohio

[73] Assignee: Hancor, Inc., Findley, Ohio

[21] Appl. No.: 716,104

[22] Filed: Aug. 20, 1976

[51] Int. Cl.² ............................................. F16L 21/00
[52] U.S. Cl. ................................... 285/401; 285/423; 285/DIG. 4; 285/260
[58] Field of Search ........ 285/260, DIG. 4, DIG. 22, 285/401, 423, 305, 319, 360, 376, 87; 403/348, 349, 329, 353

[56] References Cited
U.S. PATENT DOCUMENTS

| | | | |
|---|---|---|---|
| 1,033,187 | 7/1912 | Metzger | 285/376 |
| 2,444,888 | 7/1948 | Baumgardner | 285/DIG. 22 |
| 3,929,359 | 12/1975 | Schmunk | 285/DIG. 4 |

*Primary Examiner*—Reinaldo P. Machado
*Attorney, Agent, or Firm*—Fay & Sharpe

[57] ABSTRACT

A connecting joint construction particularly suited for use on large diameter corrugated plastic pipe or tubing. The joint is comprised of a first main length of corrugated, generally cylindrical plastic pipe having one end portion provided with corrugations which, considered from the interior of the pipe, are somewhat smaller in height than the corrugations of the main body portion of the pipe. One of the smaller corrugations has at least one locking area therein defined between a stop member and a locking member and the smaller corrugations further include a plurality of sets of axially aligned grooves formed therein. A second main length of pipe is provided with a smooth walled end portion of a diameter less than the minimum internal diameter of the one end portion of the first pipe. Cleat members extend outwardly from the smooth diameter end portion and are sized so that they can be slid longitudinally into the grooves in the first pipe and rotated into a corrugation with one of the cleat members lockingly received in the locking area to thereby lock the two pipe sections together. Preferably, the second length smooth walled end portion has two sets or circumferential rows of cleat members which engage adjacent ones of the smaller corrugations in the first length one end portion when the two pipe lengths are connected to each other. With this construction, the two lengths may be bent at sharp angles to each other at the joint area without adversely affecting the integrity of the joint.

11 Claims, 6 Drawing Figures

FIG. 5
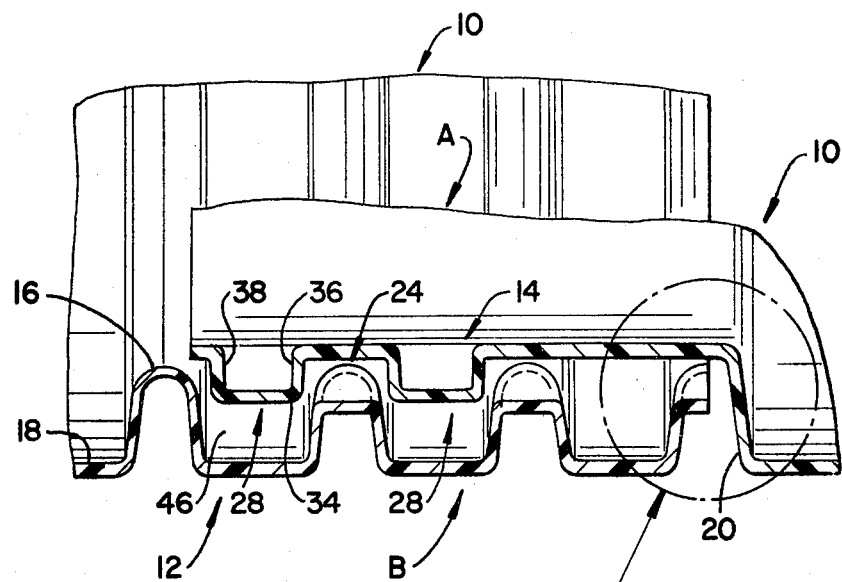
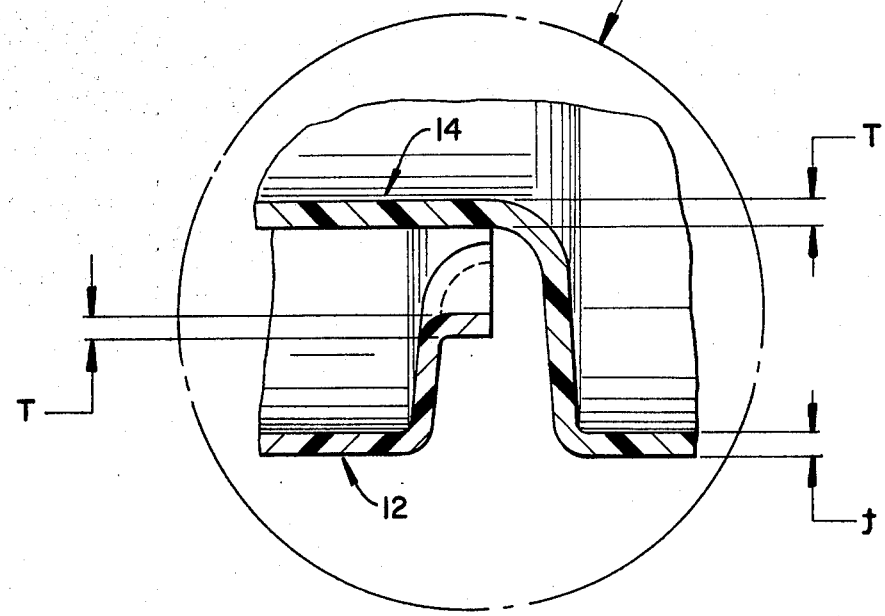
FIG.6

4,082,327

CONNECTING JOINT FOR CORRUGATED PLASTIC TUBING

BACKGROUND OF THE INVENTION

The subject invention is directed toward the art of pipe joints and couplings and more particularly, to a joint construction or assembly particularly suited for corrugated plastic pipe or tubing.

The invention is particularly suited for connecting large diameter corrugated plastic drain pipe or tubing and will be described with particular reference thereto; however, it will be apparent to those skilled in the art that the joint structure could be incorporated in many other sizes of corrugated pipe or tubing used for a variety of purposes in many different environments.

Corrugated plastic pipe or tubing is widely used for many types of agriculture and industrial drainage systems. The pipe is made up in a variety of diameters and lengths which are joined together by many different types of joints and connections. In the smaller sizes various types of connections are provided which rely upon the inherent resiliency of the plastic to permit interconnection of adjacent pipe lengths. Connections which rely upon such inherent resiliency are not particularly suited to large diameter pipe sizes in that the force required to move the pipe joints into locking relationship can be substantial. Additionally, the large size pipes must be made up in shorter lengths necessitating a large number of joints for a given length.

In some instances, it has been proposed to provide a separate connecting element to encircle the adjoining ends of the pipe. However, the addition of a separate element can substantially increase the cost of the piping system. Moreover, time and labor involved in installing the separate elements can become substantial when a substantial length comprised of many interconnected pipe sections is required.

In some instances, it has also been proposed to provide a joint structure in which the mating components of the joint can be integrally formed on the end portions of the pipe lengths or sections and which joint is easy to assemble with a minimum of force being required. Such an arrangement is shown in the commonly assigned U.S. Pat. No. 3,929,359, the teachings of which are incorporated herein by reference. While the structure shown in U.S. Pat. No. 3,929,359 has provided satisfactory and advantageous results, it does have limitations for certain uses and installations. Particularly, the arrangement of this prior patent does not provide means for positively locking two adjacent lengths of the pipe or tubing together at the joint area.

The present invention contemplates a new and improved structure which provides a new joint construction which is a simple, economical, may be included as an integral part of the ends of plastic pipe or tubing lengths, which facilitates adjacent lengths of pipe to be positively locked together at the joint area and which permits adjacent lengths of pipes to be bent at sharp angles to each other at the joint areas without disturbing the integrity of the joint.

BRIEF DESCRIPTION OF THE INVENTION

In accordance with the present invention, there is provided a new and improved connecting joint construction for use in conjunction with corrugated plastic piping. The joint itself is comprised of a first main length of corrugated, generally cylindrical plastic pipe having one end portion provided with corrugations which, when considered from the interior of the pipe, are somewhat smaller in height than the corrugation of the main body portion of the first length. One of these smaller corrugations has at least one locking area therein and the smaller corrugations further include a plurality of sets of axially aligned grooves formed therein. A second main length of pipe is provided with a smooth walled end portion of a diameter less than the minimum internal diameter of the one end portion of the first pipe. cleat members are included to extend outwardly from the smooth diameter end portion and are sized so that they can be slid longitudinally into the grooves in the first pipe and then rotated into one of the smaller corrugations. One of the cleat members is lockingly received in the locking area during relative rotation between the two main lengths to provide a positive locking arrangement between the two pipe lengths.

The second length of pipe may include at least two sets of cleat members with each set disposed at axially spaced locations from each other in a manner such that the cleat members of each set may be received in separate ones of the corrugations in the first length of pipe. The cleat members are dimensioned to extend radially outward from the outer surface of the second length smooth walled end portion and at least one locking area portion extends radially inward from the inner surface on the first length in a manner such that there is an interference relationship between one of the cleat members and the locking area portion as the first and second lengths are rotated relative to each other. At least one of the locking area portion and cleat members is resiliently deformable to permit the cleat member engaging the locking area portion to be passed into the locking area during further relative rotation between the first and second lengths.

A pair of locking areas are included in the first length and are oppositely disposed from each other thereon in a manner such that a cleat member is simultaneously received in each of the locking areas as the first and second lengths are rotated relative to each other.

The subject invention is deemed to be an improvement on and provide many advantages over prior known joint constructions of this general type. While the primary advantages are considered to be in the fact that two adjacent lengths of plastic pipe or tubing may be positively locked together and in the fact that the adjacent lengths of pipe may be moved or bent relative to each other over a wide angular range without disturbing the integrity of the joint construction, other advantages and uses for the subject invention will become apparent to those skilled in the art upon the reading and understanding of the specification.

BRIEF DESCRIPTION OF THE DRAWINGS

The invention may take physical form in certain parts and arrangements of parts, a preferred embodiment of which will be described in detail in this specification and illustrated in the accompanying drawings which form a part hereof and wherein:

FIG. 5 is an enlarged cross-sectional view showing a joint construction formed in accordance with the invention and made up with pipe lengths formed in the manner shown in FIG. 1; and, FIG. 6 is an enlarged cross-sectional view of the circled area of FIG. 5.

DETAILED DESCRIPTION OF THE PREFERRED EMBODIMENT

Figure 1:
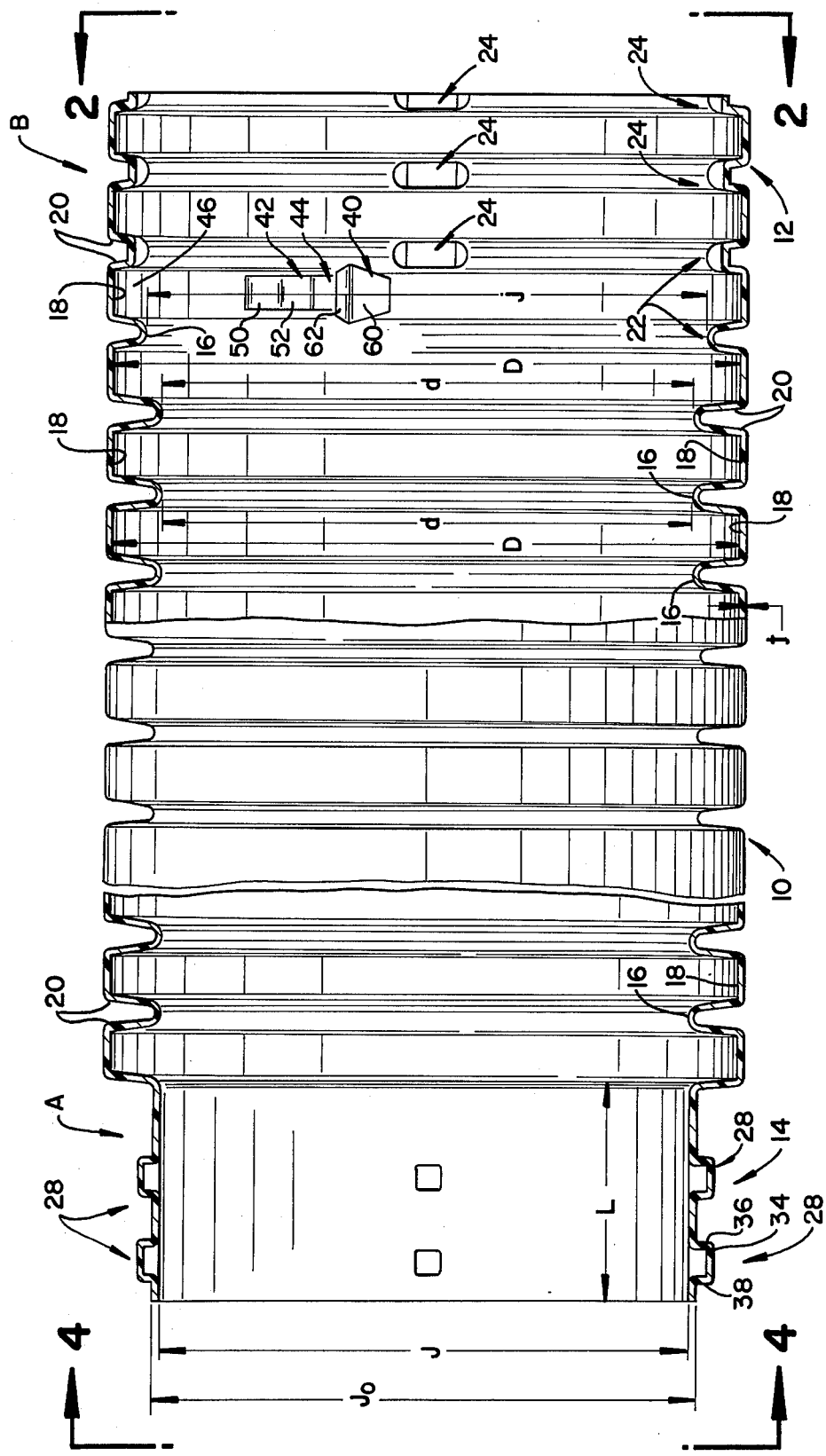
FIG. 1 is a side view in partial cross-section showing a preferred form of pipe length which incorporates the teachings of the subject invention.

Referring now to the drawings wherein the showings are for purposes of illustrating the preferred embodiment of the invention only and not for purposes of limiting same, the FIGURES show an elongated length of corrugated plastic pipe having an integral male connecting or coupling portion A at one end and an integral female connecting or coupling portion B at the other end.

The plastic pipe itself is generally designated 10 and is arranged so that it can be used in conjunction with other such sections of pipe to form connections or joints in accordance with the invention. The main body of pipe 10 is formed from plastic by conventional molding techniques such as blow molding or continuous extrusion. The particular plastic from which the pipe is formed is not critical to the invention and several different plastics such as high density polyethylene and polyvinylchloride can be used. The formation of the pipe and materials used therefor do not, themselves, form a part of the present invention so they are not described in further detail herein.

The pipe is corrugated substantially throughout its length and terminates in first female and second male end portions generally designated 12 and 14, respectively. In the central section of the pipe, the corrugations are relatively uniformly spaced and, when viewed from the interior of the pipe, comprise peaks 16 separated by valleys 18. The corrugations extend circumferentially about the pipe and it should be noted that in the subject preferred embodiment, peaks 16 are of a generally arcuate shape and valleys 18 are preferably relatively flat. The side walls 20 which join peaks 16 to valleys 18 are preferably slightly inclined.

In the preferred arrangement disclosed, the minimum internal diameter of the pipe is the diametrical distance $d$ measured between opposed peaks 16. The maximum internal diameter D is the diametrical distance betweeen opposed valleys 18. In the central section of pipe 10, the wall of the pipe is comparatively thin and has a thickness $t$ in the range of 0.080 – 0.120 inches.

With reference to end portion 12 of pipe 10, it will be noted that the final four corrugations generally designated 22 have a minimum internal diameter $j$ which is less than D but greater than $d$. While four corrugations 22 are shown in the preferred arrangement, a greater or lesser number may be used when practicing the concepts of the invention. The maximum internal diameter of end section 12 is, however, preferably substantially equal to D. The maximum outer diameter of end section 12 is preferably equal to the outer diameter of the main body of pipe 10.

Figure 2:
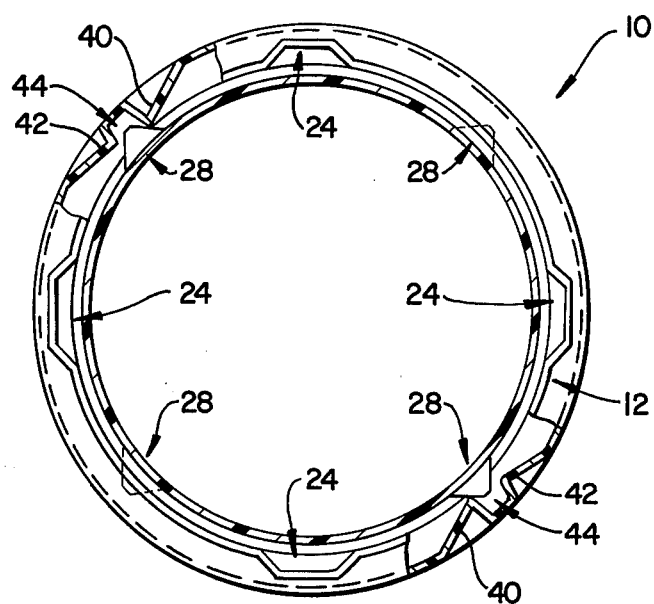
FIG. 2 is an end view in partial cross-section of the pipe length of FIG. 1 taken along lines 2—2 of FIG. 1 and further including a section of a corresponding pipe length connected thereto.
Figure 3:
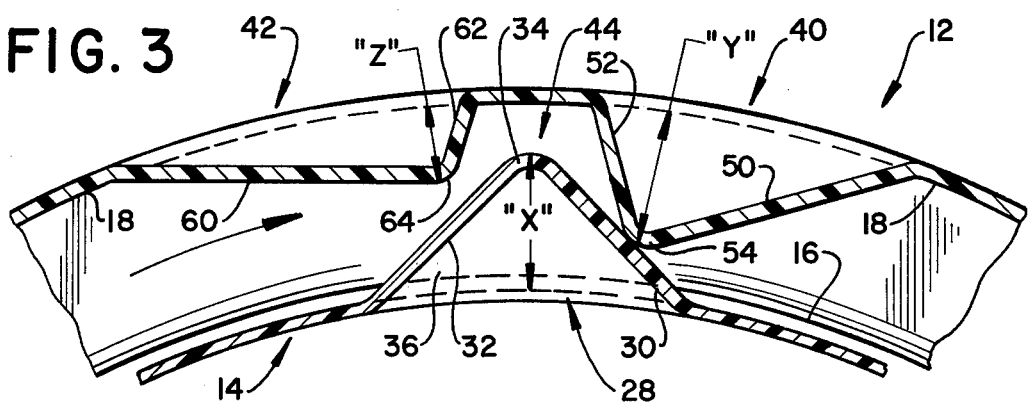
FIG. 3 is an enlarged view of the cross-sectional area shown in FIG. 2.
Figure 4:
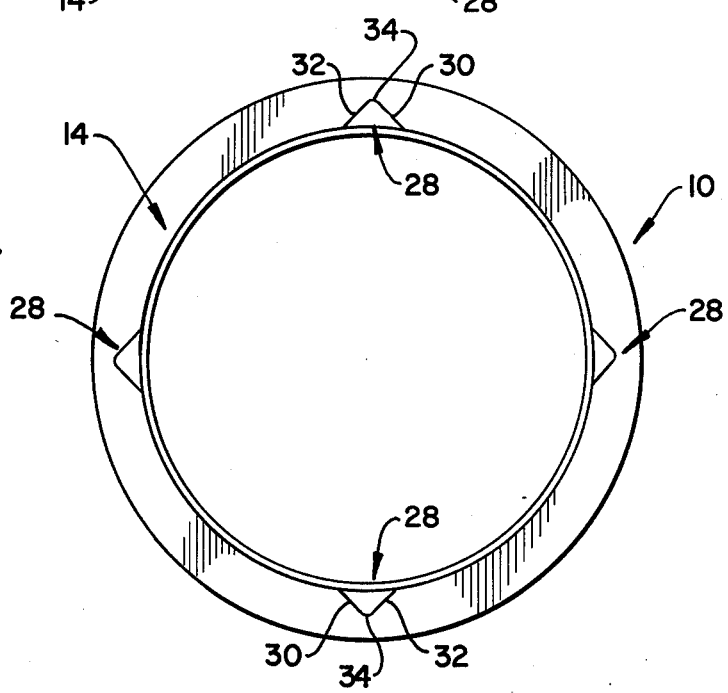
FIG. 4 is an end view of the pipe length of FIG. 1 taken along lines 4—4 of FIG. 1.

As best shown in FIGS. 1, 2 and 3, the outermost spaced corrugations 22 are provided with a plurality of sets of longitudinally aligned notches or grooves 24. For reasons which will be described in detail hereinafter, it is preferable that there are at least two sets of these aligned grooves and, in the preferred embodiment, there are four sets radially spaced apart at approximately 90°. Grooves 24 each has a somewhat trapezoidal cross-section when viewed in FIGS. 2 and 3 although other configurations could also be advantageously employed. As seen in FIG. 1, the outermost three of corrugations 22 have grooves 24 therein although this arrangement could be altered as will be appreciated from the further specific disclosure provided hereinafter.

With reference to the left hand portion of FIG. 1 and end portion 14 shown therein, it should be noted that the end portion or section is comprised of a smooth walled non-corrugated area. The internal diameter area J of smooth walled end portion 14 is, preferably, substantially equal to the minimum internal diameter $d$ of the main body section of pipe 10. The outer diameter $j_O$ is slightly larger than $d$ but smaller than $j$. The axial length L of portion or section 14 is slightly greater than the longitudinal spacing between the peaks of outermost three corrugations 22 (FIG. 5). This length can vary substantially, however, as may be deemed necessary and/or advisable to accomplish the improved overall results and structure contemplated by the subject invention.

Located adjacent the outer free end of section 14 are a plurality of cleat members each generally designated 28. These cleat members are sized and located so that they can be moved longitudinally into the sets of aligned grooves 24. As best shown in FIGS. 1 and 5, two sets of cleats 28 are disposed in an axially spaced apart relationship from each other along section 14. Each set, in turn, is comprised of four cleats 28 located circumferentially about section 14 and radially spaced approximately 90° apart from each other in the same manner as groove sets 24 with the cleat members of one set being in axial alignment with the cleat members of the other set. Axial spacing between the two cleat sets is such that they will be received in adjacent corrugations 22 when two lengths of the plastic pipe are placed in cooperative engagement to form a joint or connection.

From FIGS. 2 and 3, it will be seen that each cleat member 28 has a generally triangular configuration as viewed in a plane perpendicular to the axis of pipe 10 itself. In a plane parallel to the longitudinal axis of pipe 10, and as shown in FIGS. 1 and 5, the cleat members have a generally rectangular configuration. The cleats themselves are each comprised of first and second inclinded surfaces designated 30, 32 respectively which meet at an apex area generally designated 34. Disposed between inclined surfaces 30, 32 at the innermost edges thereof is a front wall generally designated 36 and disposed between the outermost edges of surfaces 30, 32 is a rear wall generally designated 38. The peak of apex area 34 is disposed outwardly of the outer surface of section 14 a distance $x$ (FIG. 3) and which distance is such that the cleats may be freely slidably received longitudinally into groove sets 24 without any interfering contact therewith. The height of the apex is a constant height $x$ between the inner and outermost ends of each cleat. It should also be particularly noted that cleat members 28 may take a number of alternative configurations other than the one specifically shown in the drawings and described hereinabove without in any way departing from the intent or scope of the present invention. Such alternative cleat structures may be more particularly advantageously employed for manufacturing or other reasons.

Because of the arrangement of end portions or sections 12, 14, any number of pipes 10 may be rapidly joined to form a pipe system of any desired length. FIG. 5 illustrates an enlarged cross-sectional view of a connecting joint formed between two lengths of pipe 10. As shown in this FIGURE, second end portion or section 14 of one length is moved axially into a first end portion or section 12 of the adjacent pipe. It should be noted that the arrangement of cleats 28 is such that they are freely slidable into the groove sets 24. Additionally, the two sets of cleat members 28 are located along section 14 at longitudinal positions such that when fully moved into grooves 24, the cleats lie in adjacent ones of corrugations 22 between adjacent peaks.

After being moved into a proper position in a longitudinal direction as shown in FIG. 5, a slight relative rotation between the two pipe lengths causes the cleats to move out of alignment with the notches or grooves 24 in order that the two lengths will be maintained in a connected relationship so that they cannot be moved longitudinally of each other. The configuration of the cleat members which includes inclined surfaces 30, 32 meeting at apex 34, permits inward longitudinal sliding movement to freely take place between the two pipe lengths even when they are tilted slightly out of axial alignment. Similarly, the inclined surfaces 30, 32 facilitate ease of rotational movement of the cleats in the associated corrugations or valleys. The relatively perpendicular front wall or end face 36 provides a positive lock behind the adjacent corrugation 22 to prevent axial separation of the joint pipes.

The length of insertion of section 14 of the one pipe into section 12 of the associated pipe is, in the preferred embodiment, longitudinally over three corrugations 22 with the two sets of cleat members 28 being received in the second and third corrugations spaced from the outermost free end of portion or section 12. It has been found that this particular arrangement is entirely sufficient and satisfactory to permit the two pipe lengths, once connected, to be bent to angles of 90° and greater relative to each other about the connecting joint area without destroying the integrity of the joint itself. However, it would be entirely possible and within the scope and intent of the present invention construct section 14 so that length L is longer or shorter than that specifically shown and described. Moreover, the plurality of cleat member sets could be increased or decreased and otherwise axially spaced along section 14 in other than the manner hereinabove specifically described with reference to the preferred embodiment.

In order to prevent cleat members 28 from being inadvertently rotated an amount sufficient to bring them back into alignment with grooves 24 and in order to maintain the two pipe lengths in a positively locked position relative to each other, a stop member 40 and locking member 42 which are spaced apart from each other on each side of a locking area 44 are provided in one of the valleys associated with a corrugation 22 which receives one set of cleat members 28. As best shown in FIGS. 1, 2 and 3 and in accordance with the preferred arrangement of the subject invention, two such locking areas are provided and located 180° apart on diagonally opposite sides of the tubing. Moreover, the preferred location for these locking areas is in the valley designated 46 which receives the cleat member set disposed adjacent the outermost free end of section 14. Within valley 46, locking areas 44 are peferably positioned generally near the midpoint between adjacent grooves 24 such that when smooth walled portion 14 is inserted within corrugated portion 12, clockwise movement in the view of FIGS. 2 and 3 of smooth walled end portion 14 will be permitted until the opposed cleat members are simultaneously received in the associated and opposed locking areas 44.

With continued reference to FIGS. 1 and 2 and with particular reference to FIG. 3, each stop member 40 is comprised of a pair of inclined side surfaces 50, 52 meeting at an apex area 54 spaced from the inner surface of one end section 12 a distance $y$. Distance $y$ is such that inclined surface 30 of cleat member 28 will engage apex area 54 at a position spaced toward the interface between inclined surface 30 and the smooth walled area of end portion 14. The dimensional relationship between the cleat and stop members is such that the cleat member may not be rotated passed the stop member so that the stop member effectively defines the maximum amount of relative rotational movement permitted between the two pipe lengths.

Each locking member 42 is defined by an inclined side wall 60 and an inclined lock surface 62 meeting at an apex 64 spaced from the inner surface of section 12 a distance $z$. Distance $z$ is such that there will be interference contact between the cleat and locking members as the two pipe lengths are rotated relative to each other in order that the cleat members will be passed into locking areas 44. Inclined side wall 60 has a gradual inclination and, in effect, defines a camming surface for camming cooperation with apex area 34 of the cleat member. Because of the configuration of both the cleat and locking members and the fact that the tubing is constructed from a plastic material such as high density polyethylene and polyvinyl-chloride, there is some inherent resiliency in these members. Accordingly, as section 12 is rotated clockwise in the views of FIGS. 2 and 3 and as apex areas 34 engage inclined sides 60, either one or both of these members will be resiliently deformed somewhat in order that the cleat members may be passed by the associated locking members and into the respective locking areas 44. The sides of the locking areas are, of course, each defined by inclined side surface 52 of stop member 40 and inclined lock surface 62 of locking member 42. Once cleat members 28 are disposed in the associated locking areas, it is very difficult to rotate them therefrom back passed the locking members. This is due to the steep inclination of inclined lock surfaces 62 and the interference relationship between the cleat and locking members.

As shown in FIG. 2 and in accordance with the preferred arrangement, the locking areas are located so that oppositely disposed cleat members 28 will be simultaneously received in the two locking areas. Once the cleat members are so received, the two lengths of plastic pipe are lockingly engaged with each other so as to prevent undesired axial separation thereof. Moreover, the amount of longitudinal insertion of end portion 14 into end portion 12 and the cooperative relationship between the two sets of cleat members 28 with the associated corrugations are such that the two lengths of pipe may be bent at 90° angles to each other about the connecting joint area without disturbing the integrity of the joint. This feature is deemed to be particularly advantageous when installing the pipes for many and varied practical uses.

While the specific construction and location for stop members 40, locking members 42 and locking areas 44 defined thereby have been disclosed and discussed above with reference to the preferred embodiment, it will be appreciated by those skilled in the art that the precise construction and/or location thereof may be varied or altered without in any way departing from the intent or scope of the present invention. For example, it would be possible to locate the locking areas in valleys other than the one specifically shown in the drawings, include more than just two locking areas and/or include the locking areas in more than one valley of the corrugations which comprise section 14. Modifications at least to location would, however, normally be made in conjunction with modification to the location of cleat members 28 on end portion 14.

Referring now particularly to FIG. 6, wall thickness T of end section 12, 14 is preferably slightly greater than the wall thickness t of the main portion of pipe 10. FIG. 6 illustrates a gradual transition from thickness t to thickness T of the end sections. Thickness t is preferably selected so that the main body of the pipe has adequate strength to resist the normal crushing or compressive forces which will be encountered in typical use environments. By increasing the thickness of end section 12, 14, the necessary strength can be assured in the joint without increasing the overall thickness and consequently the weight of the entire pipe. Preferably, the wall thickness of each of the first and second sections which make up similar joints are slightly greater than the wall thickness of the main body of the pipe.

The invention has been described with reference to the preferred embodiment. Obviously, modifications and alterations will occur to others upon a reading and understanding of the specification. As an example, one such modification would be to reverse the positions of corrugations 22 on end portion 12 and cleat members 28 on end portion 14 so that corrugations 22 are located on the outside of end portion 12 and cleat members 28 are located on the inside of end portion 12. It is our intention to include all such modifications and alterations insofar as they come within the scope of the appended claims or the equivalents thereof.

Having thus described our invention, we now claim:

1. A joint construction for plastic pipe comprising:
a first length of corrugated, hollow and generally cylindrical plastic pipe having an internal wall surface defined by adjacent circumferentially extending, longitudinally spaced peaks and valleys with the internal diameter of said first length measured diametrically between opposite peaks between opposite valleys being equal to $d$ and the internal diameter measured diametrically between opposite valleys being equal to D wherein D is greater than $d$;
a first portion of said first length defining an end therefor having an internal diameter $j$ measured diametrically between opposed peaks which is greater than $d$ but less than D and a maximum internal diameter measured diametrically between opposed valleys which is substantially equal to D, said first portion including at least one integral stop member and at least one integral locking member disposed in a spaced apart cooperative relationship with each other in one of the first portion valleys and extending radially inward therefrom for defining a locking area therebetween, said at least one locking member being defined by first and second inclined side walls meeting at an apex area with said first side wall having an angle of inclination less than that of said second side wall for defining a cam surface and with said second side wall defining a lock surface which comprises one side of said locking area, said first portion further including a plurality of sets of longitudinally aligned grooves formed in at least the peaks spaced from said one valley toward the outer free end of said first portion in a non-aligned relationship with said locking area;
a second length of hollow plastic pipe having a generally cylindrical corrugated portion and a smooth walled cylindrical second portion which defines an end of said second length and has an outer diameter which is slightly less than $j$;
at least two sets of cleat members extending outwardly from the outer surface of said second length second portion with sets axially disposed from each other therealong, said cleat members having a configuration and location to permit them to move longitudinally into the aligned grooves in the first length first portion so that a portion of said second length is received in said first length first portion with the cleat members of one set being located in said one valley and the cleat members of the other set being located in another valley of the first length first portion; and,
said cleat members and said at least one locking member being relatively dimensioned from said second length second portion and said first length first portion respectively such that there is an interface relationship therebetween as said first and second lengths are rotated relative to each other after said second length second portion has been received in said first length first portion, at least one of said locking and cleat members being resiliently deformable as the associated of said cleat members engages said locking member cam surface to permit said associated cleat member to be passed into said locking area during further forced rotation between said first and second lengths until said associated cleat member is lockingly received in said locking area between said at least one stop member and said locking member lock surface, the incline of said lock surface then preventing rotation between said first and second lengths in the opposite direction unless a rotational force greater than the rotational force required to move said associated cleat member over said cam surface and into said locking area is applied thereto.

2. The joint construction as defined in claim 1 wherein the cleat members in each set are located at relatively uniform circumferential spacings about said second length second portion and wherein the cleat members of said at least two sets are in longitudinal alignment with each other.

3. The joint construction as defined in claim 1 wherein said cleat members are defined by first and second inclined surfaces meeting at an outermost apex area with said outermost apex area of the associated of said cleat members adapted to engage said locking member second side wall as said first and second lengths are rotated relative to each other.

4. The joint construction as defined in claim 1 wherein said at least one stop member extends inwardly from the inner surface of first length portion an amount greater than said at least one locking member, said stop member preventing rotation of the associated of said cleat members therepast to define a positive maximum rotated position between said first and second lengths.

5. The joint construction as defined in claim 1 wherein said at least one stop and locking members comprise a pair of said members defining a pair of locking areas oppositely disposed from each other in said first length first portion, a cleat member being simultaneously received in each of said locking areas as said first and second lengths are rotated relative to each other following longitudinal insertion of said second length second portion into said first length first portion.

6. In a joint construction for corrugated plastic pipe of the type wherein a first end portion of a first length of pipe axially receives a second end portion of a second length of pipe and wherein one of said first and second end portions includes corrugations axially spaced therealong with said corrugations having alternating peaks and valleys with a plurality of grooves formed in at least the first of the peaks spaced inwardly from the outermost free end of said one portion and wherein the other of said first and second portions includes a plurality of cleat members having a configuration and location to permit them to move longitudinally into the plurality of grooves in said one portion with said cleat members being finally received in at least one valley of said one portion, said first and second lengths being rotatable relative to each other so that said cleat members and grooves are in a non-aligned position with each other in order to retain the said lengths in a joined condition, the improvement comprising:

at least one locking area disposed in at least one valley of said one portion, one of said cleat members being lockingly received in said locking area when said first and second lengths are rotated relative to each other, said at least one locking area beind defined between spaced apart stop and locking members which extend radially from said at least one valley of said one portion, said locking member including a pair of inclined walls defining opposed cam and lock surfaces with the wall defining said lock surface having an angle of inclination greater than the wall defining said cam surface and further defining one side of said locking area, said cleat members and said at least one locking member being relatively radially dimensioned from said other and said one portions respectively such that there is an interference relationship therebetween as said first and second lengths are rotated relative to each other after said cleat members in said other end portion are received in said at least one valley of said one portion, at least one of said locking and cleat members being resiliently deformable as the associated of said cleat members engages said locking member cam surface to permit said associated cleat member to be passed into said locking area during further forced relative rotation between said first and second lengths until said associated cleat member is lockingly received in said locking area between said at least one stop member and said locking member lock surface, the inclination of said lock surface then preventing rotation of said first and second lengths in the opposite direction unless a rotational force greater than the force required to move said associated cleat member into said locking area is applied thereto.

7. The improvement as defined in claim 6 wherein said cleat members are defined by first and second inclined surfaces meeting at an outermost apex area with said outermost apex area of the associated of said cleat members adapted to engage said locking member cam surface as said first and second lengths are rotated relative to each other.

8. The improvement as defined in claim 12 wherein said stop member radially from said other portion an amount greater than said locking member, said stop member preventing rotation of an associated cleat member therepast to define a positive maximum rotated position between said first and second lengths.

9. The improvement as defined in claim 6 wherein a plurality of consecutive peaks in said one of said first and second end portions from the outermost free end thereof each include a plurality of grooves with the grooves in said plurality of consecutive peaks being in longitudinal alignment with each other to thereby form a plurality of groove sets, said other of said first and second portions including at least two sets of cleat members with said sets disposed at axially spaced locations therealong, the cleat members of said sets being axially spaced apart so as to be received in separate ones of said valleys in said one of said first and second portions.

10. The improvement as defined in claim 12 wherein said at least one locking area comprises a pair of locking areas oppositely disposed from each other in said one of said first and second portions, a cleat member being simultaneously received in each of said locking areas as said first and second lengths are rotated relative to each other following longitudinal insertion of said second length second portion into said first length first portion.

11. The improvement as defined in claim 6 wherein said first length first end portion comprises said one portion and includes said corrugations with said corrugations having internal alternating peaks and valleys, said second length second portion comprising said other portion and having said cleat members thereon, said cleat members being configured to extend radially outward from the outer surface of said second length second portion and said stop and locking members being configured to extend radially inward from the inner surface of said first length first portion.

* * * * *